Sept. 24, 1968  F. C. ERKE  3,402,960
COLLAPSIBLE SLEEPER CAB FOR TRUCKS
Filed Dec. 21, 1966
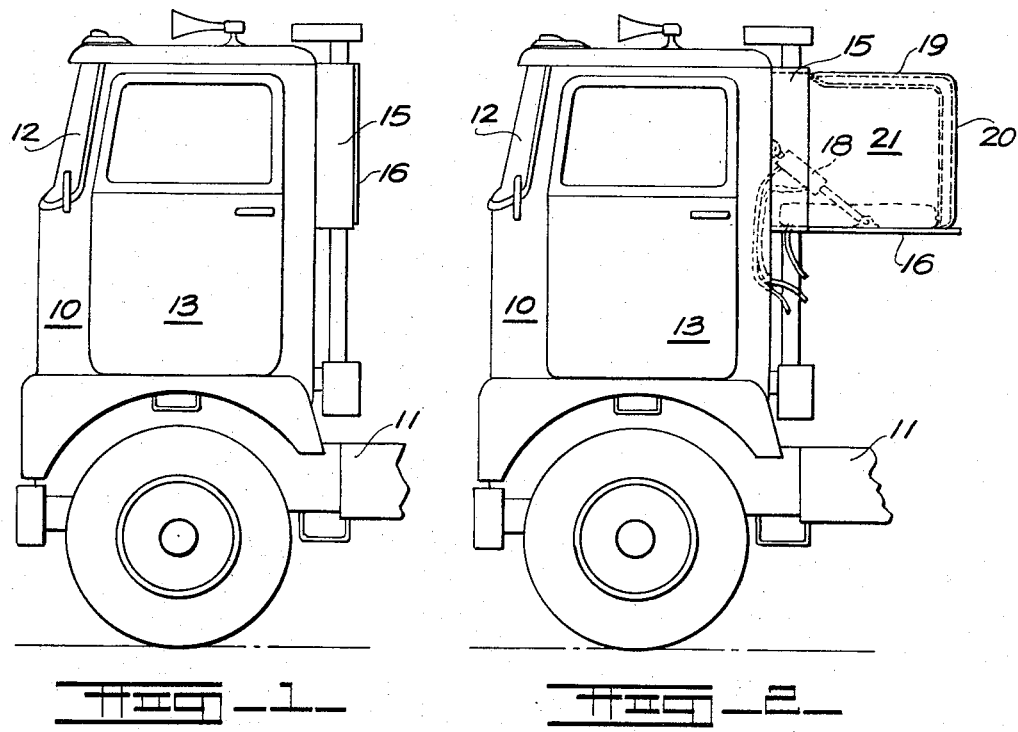
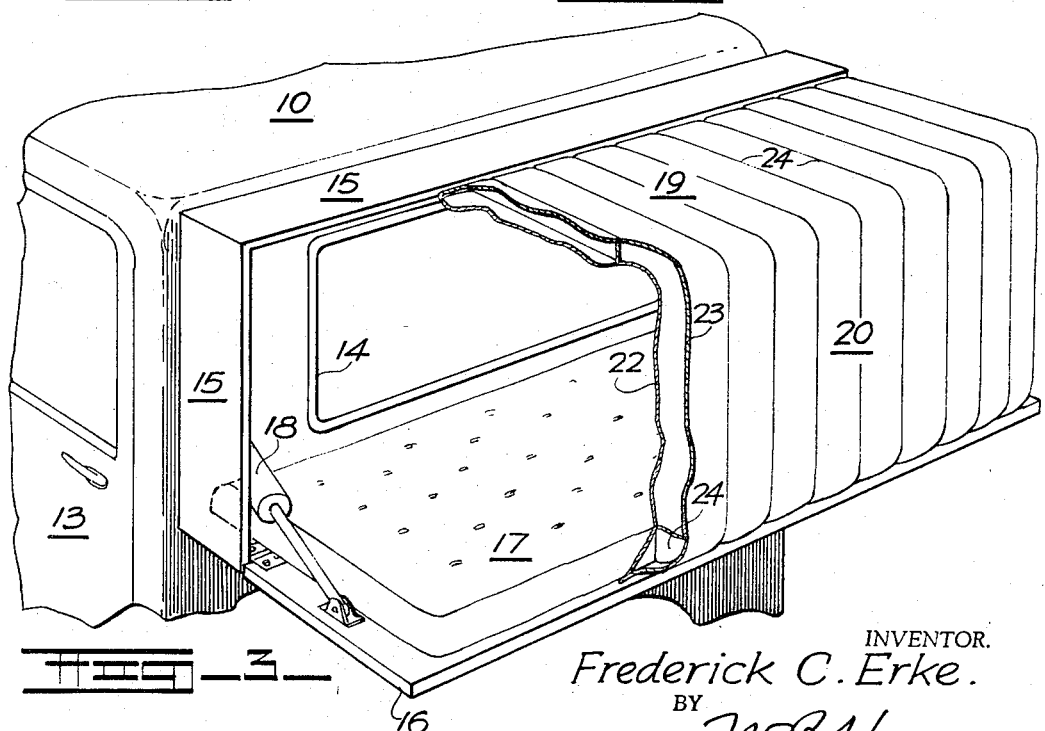
INVENTOR.
Frederick C. Erke.
BY
W. B. Harpman
ATTORNEY.

United States Patent Office 3,402,960
Patented Sept. 24, 1968

3,402,960
COLLAPSIBLE SLEEPER CAB FOR TRUCKS
Frederick C. Erke, 706 Perkinswood SE.,
Warren, Ohio 44483
Filed Dec. 21, 1966, Ser. No. 603,663
4 Claims. (Cl. 296—23)

ABSTRACT OF THE DISCLOSURE

A collapsible inflatable sleeper cab for a truck body, having a downwardly swingable bed portion and an enveloping space defining double walled inflatable member thereon, forming an enclosure thereabove.

---

This invention relates to sleeper cabs for trucks, and more particularly to a sleeper cab construction that may be collapsed to a small dimensioned package attached to the back of the truck's body and expanded by opening the same and inflating a portion thereof to form a suitable bed and enveloping enclosure thereabout.

The principal object of the invention is the provision of a collapsible inflatable sleeper cab for mounting on a cab of a tractor, such as used to tow a trailer and form a tractor trailer combination as known in the art. A further object of the invention is the provision of a collapsible inflatable sleeper cab for attachment to the cab of a tractor and arranged to occupy a minimum of space rearwardly of said cab, to provide the maximum amount of room on said tractor for the trailer normally pivotally attached to said tractor. Sleeper cab constructions on tractors used for hauling trailers have been heretofore known and have generally comprised an integral cab and sleeper compartment body mounted on the tractor and utilizing the necessary space to accommodate the driver's compartment or cab, as well as the sleeper area immediately therebehind. These constructions not only occupy valuable space on the tractor but add hundreds of pounds of weight thereto, which could be more advantageously devoted to pay load.

The invention disclosed herein provides a convenient and entirely practical sleeper cab construction which may be attached to the cab on any tractor, and which will occupy a minimum of space in its collapsed closed position, and at the same time be capable of being opened into usable condition to provide a suitable bed, properly enclosed by double walled insulated construction.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a side elevation of a portion of a tractor showing the driver's cab thereon, with the collapsible inflatable sleeper cab attachment in collapsed position.

FIGURE 2 is a side elevation of a portion of a tractor showing the driver's cab and the collapsible inflatable sleeper cab attachment thereon in open inflated usable position.

FIGURE 3 is a perspective elevation of a portion of the driver's cab showing the collapsible inflatable sleeper cab attachment with parts broken away and parts in cross-section.

By referring to the drawings and FIGURES 1 and 2 in particular, it will be seen that a tractor such as used for towing trailers has been partially illustrated and is of the type wherein the driver's cab is mounted over the engine. The cab is indicated by the numeral 10, the chassis of the tractor by the numeral 11. The driver's cab has the usual windshield 12 and access door 13, and the cab 10 is provided with the usual rear window 14, which is shown in FIGURE 3 of the drawings. A rectangular frame having one side thereof arranged to fit tightly against the back of the cab 10 is positioned on the cab around and about the window 14, and the window is then removed so that the opening remaining provides access to an area partially defined by the rectangular frame 15 and extending rearwardly thereof when a hinged closure panel 16 is moved to horizontal position, as shown in FIGURES 2 and 3 of the drawings. The hinged closure panel 16 is of a size and shape forming a complete closure for the back open area of the rectangular frame 15 when the same is closed, and it will be seen that it is hinged to the frame 15 along one of its longitudinal edges. An inflatable air mattress 17 is positioned on the closure panel 16 and extends inwardly thereof on the lower portion of the rectangular frame 15 and abuts the back wall of the cab 10. Piston and cylinder assemblies 18 are pivotally positioned between the inner sides of the rectangular frame 15 and the opposite ends of the closure panel 16 and connected with the air compressor on the tractor unit so that upon introduction of air pressure into the piston and cylinder assemblies 18 the closure panel 16 may be moved downwardly to a horizontal position as shown in FIGURES 2 and 3 of the drawings, or alternately upwardly to vertical closed position as seen in FIGURE 1 of the drawings.

In order that the air mattress 17 and the area thereabove may be suitably enclosed, a flexible inflatable double walled structure is provided to form top, back and end walls 19, 20 and 21 respectively. The flexible inflatable double wall structure includes an inner air-tight wall 22 and an outer air-tight wall 23 with suitable web members 24 therebetween, provided with intercommunicating passageways so that compressed air introduced into the area betwen the walls 22 and 23 will inflate and space the same with respect to one another, and due to the shape and arrangement of the top 19 back wall 20 and end walls 21, the structure will assume a desirable configuration forming a suitable enclosure over and above the closure portion 16 and the mattress 17 thereon.

It will be obvious to those skilled in the art that a single air line control valve may be used to control the operation of the piston and cylinder assemblies 18 which open and close the structure as well as inflating and deflating the flexible inflatable double walled structure which forms the top 19, back wall 20 and end wall portions 21 of the sleeper cab. The flexible inflatable double walled structure is closed at its forwardmost edge and attached in an air-tight and water-tight manner to the rear longitudinal uppermost edge of the rectangular frame 15. The lower edge of the flexible inflatable double walled structure defining the back wall 20 is closed and attached in an air and water-tight manner to the outer longitudinal edge of the closure panel 16, and the lower edges of each of the end portions 21 are similarly attached to the ends of the closure panel 16. The entire arrangement is such that the flexible inflatable double walled structure can be collapsed into the area defined by the rectangular frame 15, along with the air mattress 17, when the closure panel 16 is moved to vertical position by the piston and cylinder assemblies 18 as hereinbefore described.

Those skilled in the art will observe that the closure panel 16 is arranged to sealingly engage the outer edge of the rectangular frame 15 when it is moved into vertical closed position so that the collapsed closed sleeper cab attachment will be protected from the weather. They will also understand that the flexible inflatable double walled structure forming the top, back and end walls 19, 20 and 21 respectively, is waterproof and air-tight so as to adequately protect a person using the sleeper cab attachment. In order that it will retain its semi-rigid desirable shape in inflated condition, the webs 24 separating the double walls 22 and 23 are arranged so that longitudinal air channels alternate with the webs 24 to form semi-rigid tube-like members in side-by-side interconnected relation, as will also be understood by those skilled in the art.

It will thus be seen that a collapsible inflatable sleeper cab attachment for truck and tractor cabs has been disclosed which meets the several objects of the invention, and having thus described my invention, what I claim is:

1. A collapsible inflatable sleeper cab attachment for a truck or tractor cab, and comprising a rectangular frame and means on the frame for attaching the same to the cab adjacent an opening therein, a closure panel hingedly mounted on said rectangular frame movable from a first vertical position closing said rectangular frame to a second horizontal position extending outwardly therefrom and means for moving said hinged closure panel from one of said positions to the other and return, a flexible inflatable double walled structure attached along its edges to said rectangular frame and said hinged closure panel and arranged to be enclosed in said rectangular frame by said closure panel when uninflated and comprising a shape including a horizontal top, a vertical back and vertical end walls secured to one another when inflated and means on the frame for introducing air pressure into said flexible inflatable double walled structure.

2. The sleeper cab attachment set forth in claim 1, and wherein said means for moving said closure panel comprise pneumatically operated piston and cylinder assemblies.

3. The sleeper cab attachment set forth in claim 1, and wherein said flexible inflatable double walled structure includes spaced parallel webs defining elongated tubular chambers arranged to form a semi-rigid structure.

4. The sleeper cab attachment set forth in claim 3, and wherein said parallel webs have interconnecting passageways.

References Cited
UNITED STATES PATENTS

| | | | |
|---|---|---|---|
| 3,065,019 | 11/1962 | May | 296—23 |
| 2,821,427 | 1/1958 | Hairston | 296—23 |
| 2,782,068 | 2/1957 | Esche | 296—23 |

PHILIP GOODMAN, *Primary Examiner.*